United States Patent [19]
AuYeung et al.

[11] Patent Number: 5,838,884
[45] Date of Patent: Nov. 17, 1998

[54] SYSTEM FOR A RASTER OUTPUT SCANNER

[75] Inventors: Vincent W. AuYeung, Temple City; Khuay Cam, Stanton, both of Calif.

[73] Assignee: Xerox Corporation, Stamford, Conn.

[21] Appl. No.: 735,622

[22] Filed: Oct. 23, 1996

[51] Int. Cl.$^6$ .................................................. G06K 15/00
[52] U.S. Cl. ........................................ 395/107; 395/113
[58] Field of Search .................................. 395/101, 107, 395/105, 112, 113, 111; 347/132, 133, 226, 227, 246, 258; 358/505, 509, 514, 296, 300; 399/18, 33, 44, 178

[56] References Cited

U.S. PATENT DOCUMENTS

| | | | |
|---|---|---|---|
| 4,279,002 | 7/1981 | Rider ........................................ | 395/257 |
| 4,375,647 | 3/1983 | Mir .......................................... | 358/505 |

Primary Examiner—Arthur G. Evans
Attorney, Agent, or Firm—Robert Cunha

[57] ABSTRACT

A computer controller for a raster output scanner. The software consists of an operating system and application programs. Each application program acts as a servo loop and controls such operating variables as the laser diode input power, output light intensity and temperature, and polygon speed. The operating system receives the current values of these variables, compares them against ranges limits and will inform the operator of malfunctions or needed maintenance in addition to managing the more typical computer functions such as driving peripherals and managing memory. The entire software system is generalized to the point where it can calibrate and maintain any ROS, and therefore need not be redesigned for different ROS products. In addition, when hardware parts are replaced, the operating system can change the operating ranges instead of replacing the programs.

4 Claims, 3 Drawing Sheets

SYSTEM FOR A RASTER OUTPUT SCANNER

BACKGROUND OF THE INVENTION

A software operating system for a laser driven raster output scanner (ROS) for controlling all of the system variables and for storing and updating system component characteristics so that a common software program can be used for different printers, and for the life of each printer as individual parts are replaced, without the operator reprogramming the printer.

Various parts of a laser driven raster output scanner need to be controlled in real time. These include circuits such as those to maintain the output power of the laser at a constant intensity, the speed of the rotating polygon and the temperature of the laser assembly. Usually, a laser has its own circuit board on which are found servo loops for these elements. Increasingly, the loops are based on microprocessor firmware. As parts are replaced, the circuits typically must be re-calibrated by the maintenance personnel, and as new printers are designed, new control circuits must be created.

A laser control system which could be used for different printers and for the same printer as parts are replaced in the field, and that could be re-configured and recalibrated without operator intervention, would be a large improvement.

SUMMARY OF THE INVENTION

This invention is a generalized software program which contains memory for storing all of the system's functions, data for calibrating all of the system elements and data needed for control of the system during operation. The software, and updates to it, can be loaded onto the system using any input medium such as a telephone line or floppy disk.

This generalized software can be modified to conform to a particular printer by upgrading or modifying some functions. For example, the generalized software assumes performance matching for four color separations per image. This can be modified to one color per image during the design process of a black and white printer. Also, system parameters such as number of pages per minute and spot per inch are left as variables which can be filled in.

Similarly, for each individual printer, calibration and operating data down to the subsystem level can be supplied with a new printer when it is sold. Then, later, when parts are replaced, the calibration and operating data for each part can be supplied to the program either by a phone line from a remote location or from a floppy disk at the printer.

All of these advantages are realized by dividing the controlling software into a general operating system which does not change from one configuration to another, and specific application programs which are dedicated to particular elements of the ROS, such as the laser diode and polygon. As parts of an existing ROS are changed, the particular application that controls that element can be updated to reflect the new operating values. Similarly, when a new ROS is designed, new application programs can be created without modifying the underlying operating system. The result is a system that simplifies the design, calibration and maintenance of a ROS.

DETAILED DESCRIPTION OF THE INVENTION

Figure 1:
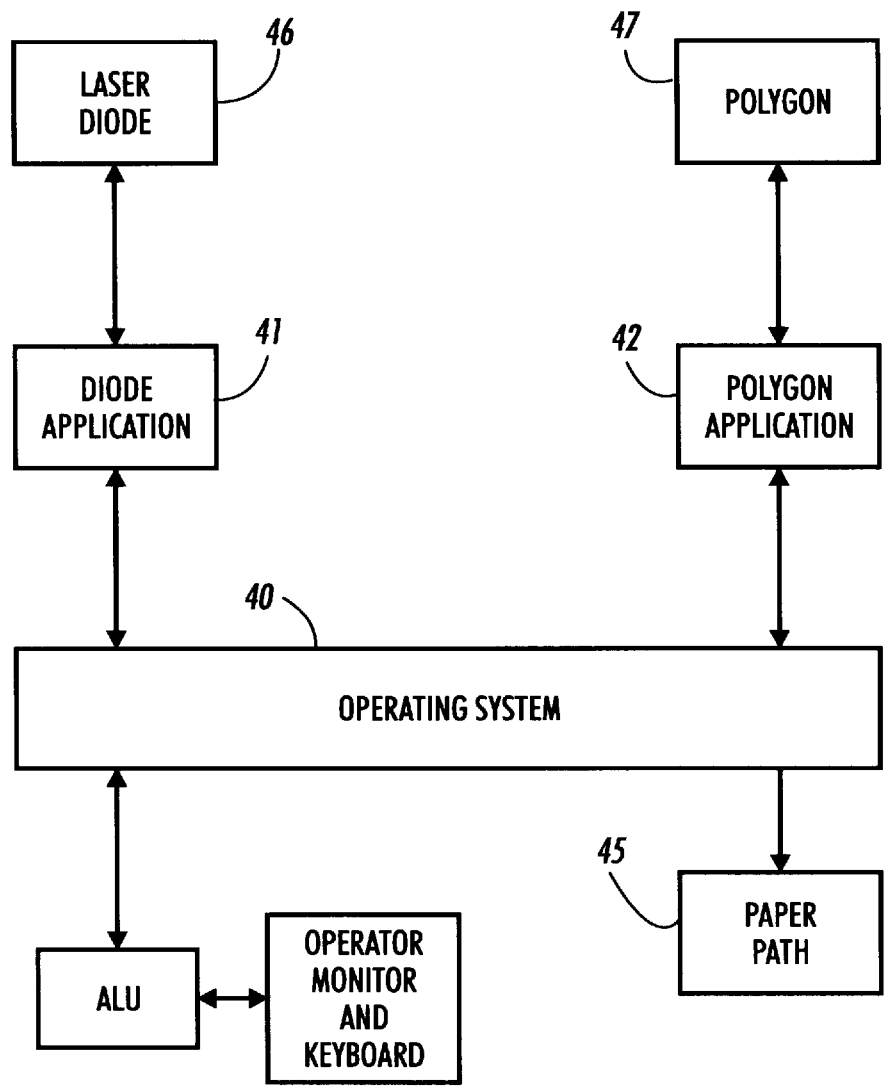
FIG. 1 is an overall block diagram of the system.

FIG. 1 shows the main sections of this printing system, namely an operating system 40 which communicates with applications programs 41, 42 and the normal computer hardware components such as the arithmetic logic unit (ALU) 43, a monitor and keyboard 44 and the IOT (image output terminal) having a paper path 45. The ALU 43 and the operating system 40 can be either a shared resource with the printing system or dedicated hardware of the printing device. Each application program contains a servo loop for its associated ROS component. Thus, for example, there is an application program 41 for the laser diode which contains servo loops for the diode 46 power input, light intensity and temperature. A second application program 42 controls the polygon 47 speed.

The laser diode assembly 46 may have one or a number of diodes in parallel. The laser diode is operating in the single spot or multi-spot mode for the printing device. In case a single diode is not fast enough for the intended application, a number of (typically two or four) diodes may be operated in parallel, painting the image in a multi-beam manner. These diodes are driven by the current from a current generator, and the total applied power is monitored by the application 41. Signals that are functions of the laser diode temperature and output light intensity are also produced in the laser diode assembly 46 and sent to the application 41.

The polygon application 41 contains a servo loop which receives a signal which is a function of the light intensity generated by the diode, and will increase or decrease the power applied to the diode to keep the output light within an acceptable range. The power applied to the laser, in the form of current, and the laser temperature are also monitored, and if either falls outside the acceptable range, signals are sent to the operating system (OS)40.

Similarly, the polygon must be monitored for speed and stability. A servo loop contained in the application 42 will monitor a speed signal which is a function of the polygon speed, to control the polygon speed to within a predetermined range. Within this range, the speed of the paper as it passes through the paper path 45 is controlled so that there will be the proper number of polygon sweeps per page.

The OS 40 provides the computing power to interface between the applications which control the laser and polygon, the paper path assembly of the IOT and the computer comprising an arithmetic logic unit (ALU) 43. The key point of the invention is that the OS maintains a virtual image of the polygon and laser diode operating levels, such as the temperature, power in and light intensity out of the laser diode, and the polygon speed, and will update these numbers as they change. The OS also maintains an acceptable range for each of these levels, and constantly compares each servo-corrected level with its range. Levels that fall out of the acceptable range are either reported to the user or to the internal machine diagnostics handling routine.

For example, the number of hours of operation of the polygon may be accumulated in the OS and when a predetermined level is reached, a recommendation to the operator is displayed to replace the polygon. Similarly, if the temperature of the diode is excessive, or if the speed of the polygon falls out of range, the printer may be shut down to prevent further damage.

It can thus be seen that the system consists of four layers. At the bottom is the IOT and computer hardware, both of which are controlled by the OS. The top layer, is the ROS hardware, namely the polygon and diode. Between the OS and top layer are the application programs which are servo loops which control the ROS hardware and report to the OS. The OS maintains the operating values received from the application programs, compares them to the associated ranges and takes the appropriate action to control the IOT if necessary. In the embodiment described herein, the operating system and application programs are running on a Philips Model 80C515 family microprocessor and are written in an Intel model 8051 like Assembly language. A higher level source code such as C could also have been used.

Figure 2:
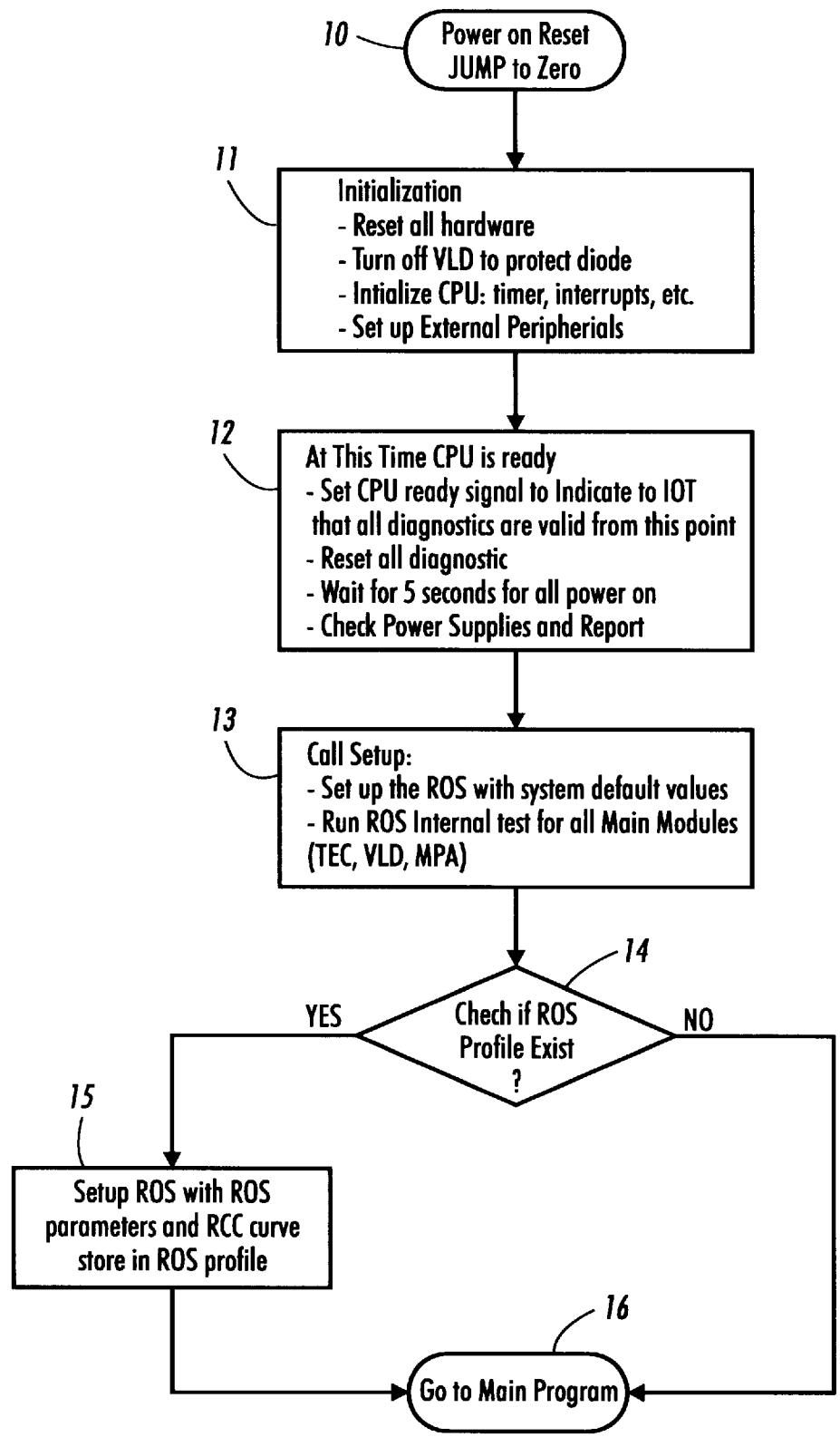
FIG. 2 is a flow chart of the initialization mode.

FIG. 2 is a flow chart of the initialization portion of the software.

The program automatically returns to block 10 if the power is turned on or reset.

Initialization proceeds in block 11. The laser (VLD) is turned off to prevent damage caused by random settings prior to calibration. Specifically, all beams are turned off, safe thresholds are set and the digital to analog converters (DAC) for the external peripherals which are used for exposure control, thresholds, exposure scaler, roll off correction curve, (RCC) scaler and offset voltage are zeroed. Every laser varies in power delivered to the output page through the optics as the beam travels from one side of the page to the other. During the calibration phase, this roll off is measured and a calibrated amount of drive current, according to the roll off correction curve, RCC, is added to the laser drive power to correct for this. Also, all of the hardware and software settings of the computer (CPU), such as the timer and interrupts, are initialized.

In block 12, the CPU sets the ready signal which informs the image output terminal (IOT, which includes the laser driver and paper path controller) that any diagnostic routine performed from this point is valid. The system then waits 5 seconds for the power levels to stabilize, and reports whether the laser is responding to the power applied by changing the exposure input to the laser driver to the minimum ON level and measuring the laser monitor voltage to determine if the laser is responding to the changed input. If there is no response, a fault is reported.

The internal components of the laser driver are set up with default values, and diagnostic self test routines are run on the main submodules, MPA, VLD and TEC, in block 13. The MPA is the motor and polygon assembly, and includes the servo system which regulates the polygon speed. The VLD is the visible (red in this case) laser diode, and the TEC is the thermostatically controlled temperature controller for the laser diode. All beams and the polygon motor are turned ON, the TEC and MPA are checked every two seconds for a minute from the time the motor was turned ON, and the laser is checked for normal operation.

Block 14 decides whether the ROS profile exists. This is a table of system thresholds and includes such things as the RCC curves and the power thresholds for the laser. If the profile exists, block 15, the program loads the laser driver with the digital to analog converter inputs to generate the proper threshold, exposure, esposure scaler, RCC scaler and offset voltages. Also, 200 bytes of RCC data from the RCC profile is loaded into the RCC RAM random access memory.

Figure 3:
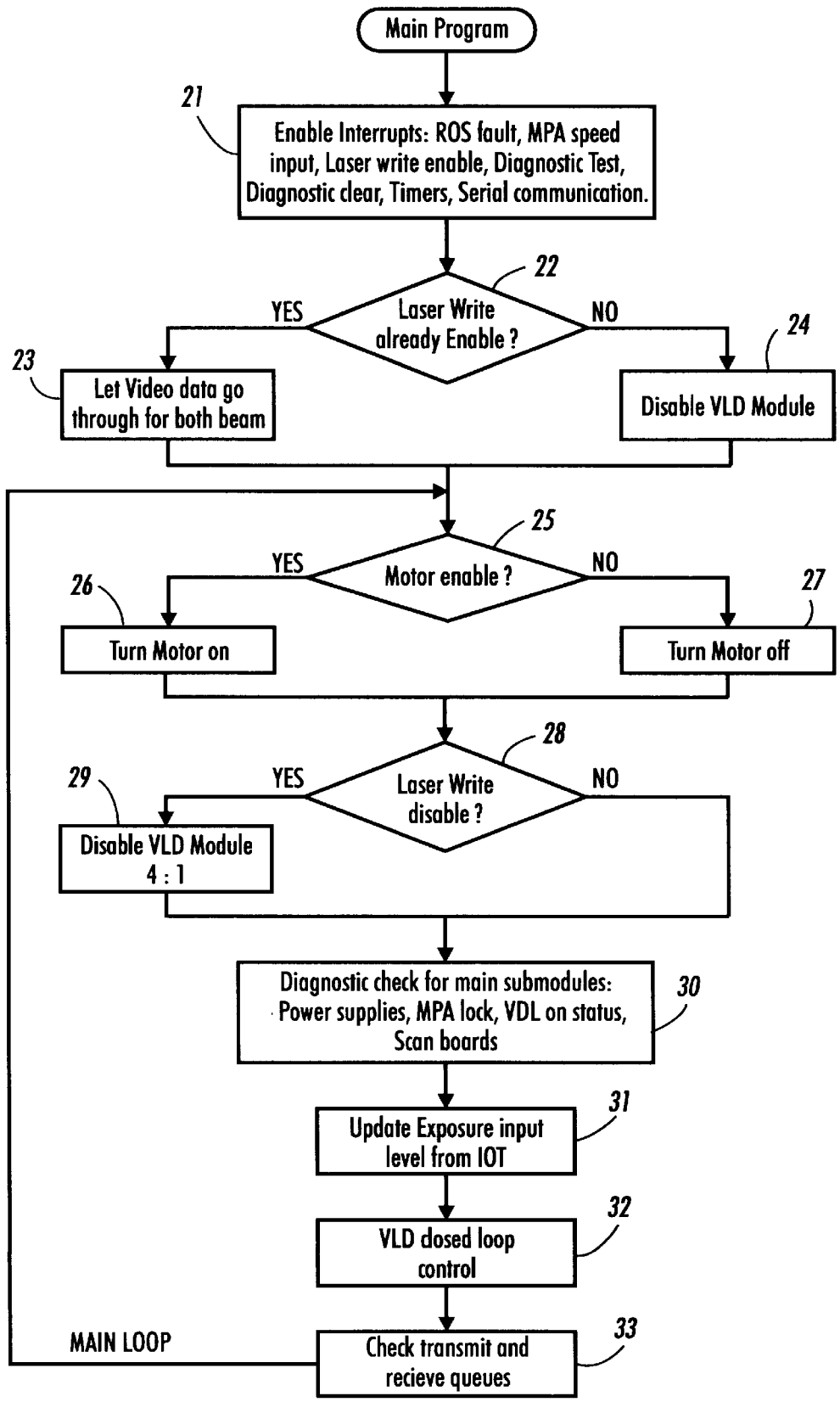
FIG. 3 is a flow chart of the run mode.

The program proceeds with block 21 of FIG. 3 which enables all of the computer interrupts. These are signals that indicate faults detected by the ROS, polygon speed, laser hardware, timers, the serial (telephone) communication line and any of the diagnostics.

Block 22 tests whether the laser is enabled. If so, block 23, the lasers are turned on and video is allowed to pass to the laser. If not, block 24, the laser is turned off, and the thresholds and DAC's are returned to zero.

The remainder of the flowchart of FIG. 3 tests for system interrupts. The motor enable signal is tested in block 25. If the signal is true, the polygon motor is turned on, step 26. Otherwise it is turned off, step 27. Similarly, the laser write disable signal is tested at block 28, and the laser is turned off if the signal is true.

Block 30 is a diagnostic check for the main submodules. The power supplies provide voltages of up to 28 volts in this system. If the polygon module is locked, a fault is reported. The VLD is reported to be ON if the monitored voltage is above the minimum ON level required to operate the laser. The scan circuit boards are checked by determining that the start of scan (SOS) and end of scan (EOS) detectors are working. Block 31 updates the exposure input levels by reading in analog exposure levels to update the exposure DAC's if laser write is enabled. Due to noise problems the exposure DAC's are updated only if the change in exposure level is greater than 2 bits, or 0.08 V. In block 32, if there are no diagnostic faults, the laser is ON and the polygon motor is enabled, then the exposure is tested by reading the intensity of the beam at the start of scan detector, and comparing it with the expected intensity as recorded in the Read Exposure Routine look up table. If the difference is equal to or greater than the allowable delta, then the exposure scaler is adjusted by an incremental step. The new value is tested to make sure the value did not roll over, and that the new scaler is within a safety range. If not, the scaler is not adjusted. At step 33 the program tests for additional data that has not been processed, then returns to the start of the main loop to continue processing any received interrupts.

The arrangement of the software into an operating system and application programs for the control of a ROS leads to the advantage that the particular ROS functions can be separated into smaller components, which leads to finer control over system calibration and maintenance. For example, in a prior art system where the laser diode is controlled by a dedicated microprocessor servo loop, when the diode is replaced with a new one having different operating characteristics, the servo loop must be replaced also. For ease of repair, all of the parts that must be replaced at the same time are put on a single board, and can be replaced at one time. With this invention, since the servo loop is an application of the operating system, it can be loaded with the characteristics of the new diode from the operating system, and so only the diode need be replaced, at a fraction of the cost. The result is that the intial cost of designing and manufacturing a ROS containing this invention is higher, but the resultant savings over the life of the system will more than compensate for the initially higher cost.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system for controlling a raster output scanner print head having either a laser diode means comprising a laser diode, a polygon and a paper path means, or any other light source for a printing application with or without a polygon device comprising:

if a polygon is required by the print head, a polygon application program for receiving from the polygon a signal which is a function of the polygon speed, for outputting a signal to the polygon to maintain the polygon speed within a predetermined range, a laser diode means application program for
A. receiving from said laser diode means a signal that is a function of the laser diode temperature, for outputting a signal to the laser diode to maintain the temperature within a predetermined range, and for outputting a signal which is a function of the diode temperature, and
B. receiving from said laser diode means a signal that is a function of the laser diode output light intensity, for outputting a power signal to the laser diode to control the output light intensity within a predetermined range, and for outputting a laser diode output light intensity signal and a power signal, and an operating system responsive to the signals which are functions of the polygon speed, diode temperature, light intensity and power to create an indication visible to a system operator or to stop the operation of the paper path means if any of these signals are outside of a predetermined range.

2. The system of claim 1 wherein the operating system also controls a computer comprising a user monitor to display said indication.

3. The system of claim 1 wherein the operating system also stores the current values of polygon speed, and laser diode power, or other light source characteristics of the print head, temperature and light intensity.

4. The system of claim 1 wherein said operating system is responsive to the polygon speed to vary the speed in the slow scan direction of a sheet of paper in the paper path.

* * * * *